United States Patent
McClung et al.

(10) Patent No.: US 9,520,248 B2
(45) Date of Patent: Dec. 13, 2016

(54) PORTABLE RACKING DEVICE WITH FIXED ANTI-TORQUE TANG FOR DRAWOUT POWER CIRCUIT BREAKERS

(71) Applicant: MarTek Limited, Charleston, WV (US)

(72) Inventors: Charles M. McClung, Elkview, WV (US); Russell R. Safreed, III, St. Albans, WV (US)

(73) Assignee: MARTEK LIMITED, Charleston, WV (US)

( * ) Notice: Subject to any disclaimer, the term of this patent is extended or adjusted under 35 U.S.C. 154(b) by 801 days.

(21) Appl. No.: 13/850,446

(22) Filed: Mar. 26, 2013

(65) Prior Publication Data

US 2013/0258104 A1 Oct. 3, 2013

Related U.S. Application Data

(60) Provisional application No. 61/617,950, filed on Mar. 30, 2012.

(51) Int. Cl.
*H01H 3/22* (2006.01)
*H04N 7/18* (2006.01)
*H02B 3/00* (2006.01)
*H02B 11/127* (2006.01)

(52) U.S. Cl.
CPC .............. *H01H 3/227* (2013.01); *H02B 3/00* (2013.01); *H02B 11/127* (2013.01); *H04N 7/18* (2013.01); *H04N 7/185* (2013.01); *Y10T 307/944* (2015.04)

(58) Field of Classification Search
CPC .......... H01H 3/227; H04N 7/18; H04N 7/185; Y10T 307/944; H02B 3/00; H02B 11/127
See application file for complete search history.

(56) References Cited

U.S. PATENT DOCUMENTS

| | | | |
|---|---|---|---|
| 8,307,545 B1* | 11/2012 | Ledbetter | H02B 3/00 200/50.21 |
| 8,319,123 B2* | 11/2012 | Faulkner | H02B 11/127 200/50.21 |
| 2012/0199450 A1* | 8/2012 | Bower | H02B 11/127 200/50.25 |

* cited by examiner

*Primary Examiner* — Tat Chio
(74) *Attorney, Agent, or Firm* — Thomas | Horstemeyer, LLP

(57) ABSTRACT

A portable motorized device for remotely inserting or removing (racking) draw-out power circuit breakers. Many different designs of draw-out circuit breakers may be connected or disconnected from an energized bus by a human operator cranking a jack screw mechanism that is part of the breaker. The device herein described provides a portable, motorized device that can be hand-carried to the work location and affixed to the circuit breaker without the need of any modification to the breaker or its enclosure. The torque that is required to operate the breaker's racking mechanism is provided by an electrically powered gear motor. Attached to the output shaft of the gear motor is a socket that engages the circuit breaker racking screw. Anti-torque is provided by a portion of the portable racking device that engages the racking screw support frame.

20 Claims, 7 Drawing Sheets

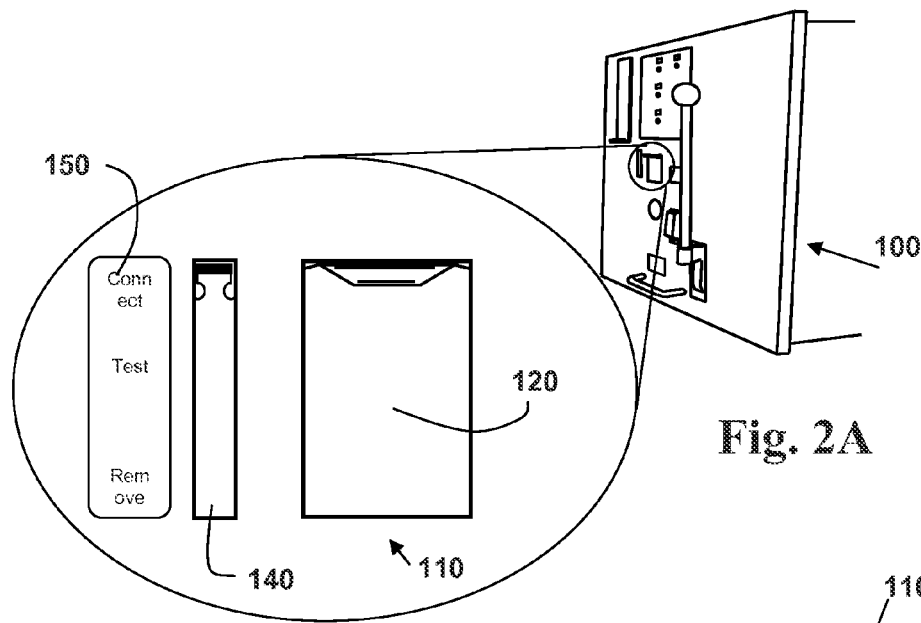
Fig. 2A
Fig. 2B
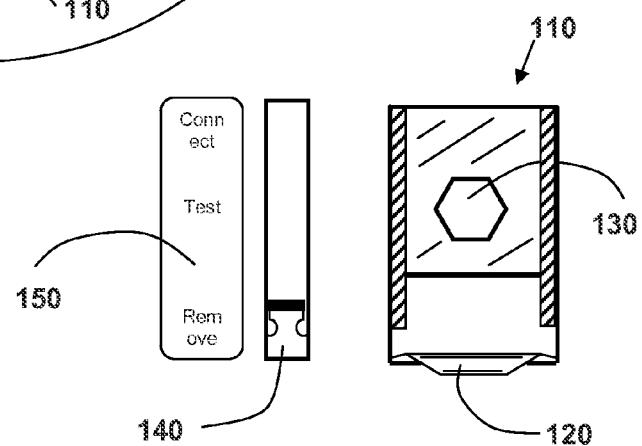
Fig. 2C

PORTABLE RACKING DEVICE WITH FIXED ANTI-TORQUE TANG FOR DRAWOUT POWER CIRCUIT BREAKERS

CLAIM OF PRIORITY

This application claims priority to co-pending U.S. Provisional Application 61/617,950, entitled "Portable Racking Device With Fixed Anti-torque Tang for Drawout Power Circuit Breakers," and filed on Mar. 30, 2012, which is incorporated by reference herein.

BACKGROUND OF THE INVENTION

In larger power systems, a typical draw-out air circuit breaker is connected or disconnected from the energized bus for maintenance or repair by a human operator who physically rotates a racking screw in order to connect or disconnect the breaker from the electrical supply bus. In order to effect the operation described above, a human operator must stand within arms-reach of the circuit breaker, which also means he or she is in close proximity to the circuit breaker. If the circuit breaker should happen to fail catastrophically, the human operator is at risk of serious injury or death from the resulting arc-blast and flying debris.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles in the disclosure. Moreover, in the drawings, like reference numerals designate corresponding parts throughout the several views.

FIG. 2A, shows the location of a magnified region of the draw-out circuit that is depicted in FIGS. 2B and 2C.

FIG. 2B is a close-up view of the breaker racking screw window with the breaker racking screw window access shutter in the closed position.

FIG. 2C is a close-up view of the breaker racking screw window with the breaker racking screw window access shutter in the open position, revealing the racking screw.

DETAILED DESCRIPTION

The present disclosure facilitates the remote racking of draw-out power circuit breakers with a portable, electrically driven racking device that is easily affixed to a circuit breaker without the need of permanently modifying the circuit breaker or the circuit breaker enclosure. The portable racking device is small enough to be stored and transported in a hand-held carrying case.

In some embodiments of the present disclosure, the portable racking device comprises an electrically-driven motor and gearbox, power supply, and all circuitry necessary to run the electric motor bi-directionally while monitoring the output torque of the gear motor and the number of turns of the racking screw for determining the position of the circuit breaker. The portable racking device may be controlled by a handheld remote control in some embodiments of the present disclosure. Some embodiments may further comprise a video camera attached to the racking device that allows a human operator to visually monitor the position and progress of the breaker while it is being racked. Further, some embodiments may include a video screen that is contained in the remote hand-held control station to permit viewing of video from the video camera.

Figure 1:
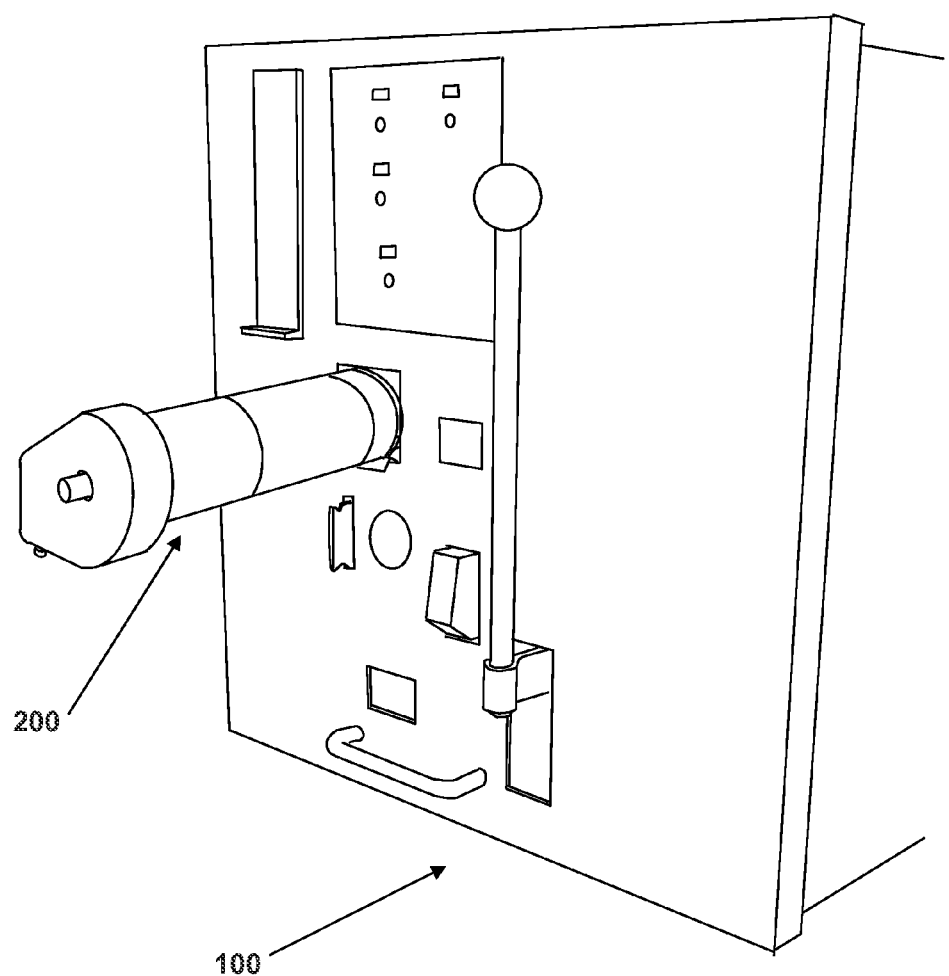
FIG. 1 is an illustrative example of a circuit breaker shown with the portable actuator engaged, according to the various embodiments of the present disclosure.

With reference to FIG. 1, the portable racking actuator 200 may be attached to a typical draw-out circuit breaker 100 as shown, for racking the breaker onto the bus, or racking the breaker off of the bus. In some embodiments of the present disclosure, the portable racking actuator 200 may attach directly to an external or front faceplate of the draw-out circuit breaker 100. In other embodiments of the present disclosure, the portable racking actuator may attach to the underlying structure, frame, or skeleton of the circuit breaker after the external or front faceplate has been removed.

With reference to FIG. 2A, a magnified region of the draw-out circuit breaker 100 is shown, which depicts a typical breaker racking screw access window 110, breaker racking screw access window shutter 120, and corresponding breaker position indicator 140 and position indicator label 150, showing the breaker in the 'Connect' position. Such an example is illustrative, as various circuit breakers 100 may arrange the breaker racking screw access window 110, breaker racking screw access window shutter 120, and corresponding breaker position indicator 140 in different configurations or positions.

FIG. 2B depicts an enlarged section of the circuit breaker 100, for the purpose of identifying the location and relationship of the circuit breaker racking screw window 110, the circuit breaker racking screw access window shutter 120, the circuit breaker position indicator 140, and the circuit breaker position indicator label 150. For illustrative purposes only, the circuit breaker racking screw access window shutter 120 is closed or shuttered.

FIG. 2C shows the circuit breaker racking screw access window shutter 120 in the open position, revealing the breaker racking screw 130, and the breaker position indicator 140 in the 'Remove' position.

Figure 3:
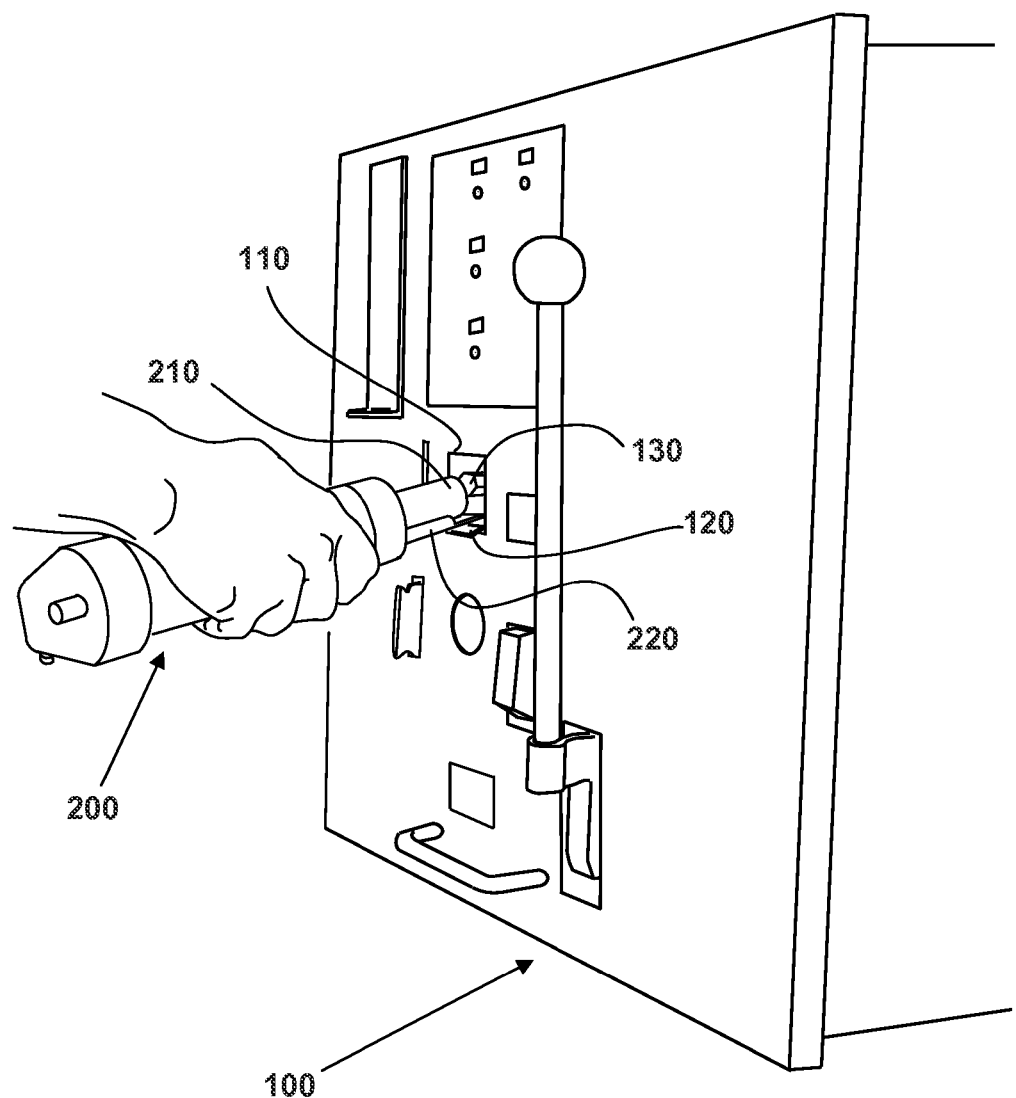
FIG. 3 depicts the racking actuator depressing the racking screw window shutter.

FIG. 3 depicts one embodiment of the present disclosure, wherein the portable racking actuator 200 is attached to the breaker 100 by using the anti-torque device 220 to open the breaker racking screw access window shutter 120 and engaging the drive socket 210 of the portable racking device with the breaker racking screw 130. As the drive socket 210 is rotated by the mechanical force produced by the portable racking device 200, the breaker is moved onto, or off of, the bus. The anti-torque device 220 prevents the portable racking actuator 200 from rotating as a result of the torque generated by the portable racking device 200 applied to the drive socket 210 when affixed to the circuit breaker racking screw window 110. Accordingly, the anti-torque device 220 can be formed in a rectangular shape, an 'L'shape, a polygon, or a flat tang in order to open an appropriate breaker racking screw access window shutter 120 to engage the drive socket 210 of the portable racking device with the breaker racking screw 130.

Figure 4A:
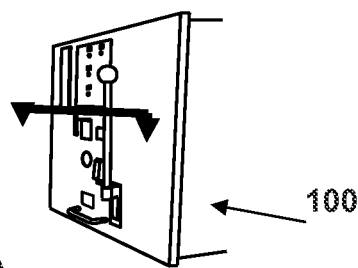
FIG. 4A shows the sectional view of the draw-out circuit breaker that is depicted in FIGS. 4B and 4C.
Figure 4B:
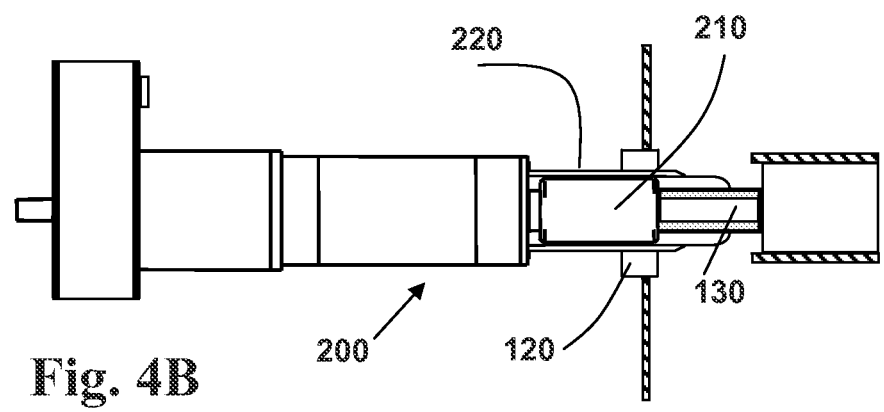
FIG. 4B is a sectional view of the portable racking device depressing the circuit breaker racking screw access window shutter.
Figure 4C:
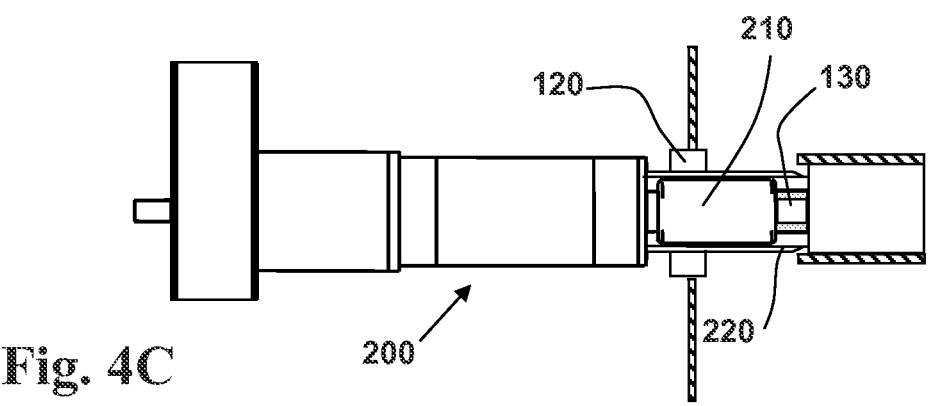
FIG. 4C is a sectional view of the portable racking device fully engaging the circuit breaker racking screw and the anti-torque device is fully engaging the circuit breaker racking screw access window.

Proceeding to FIG. 4A shown is a front plate and control interface for the circuit breaker 100 as a reference for the depictions of the disclosure in FIG. 4B and FIG. 4C. A bar with arrows is drawn across FIG. 4A to indicate the direction of the cross sectional views to be depicted in FIG. 4B and FIG. 4C.

With reference to FIG. 4B, which is a sectional view of the circuit breaker 100 as indicated in FIG. 4A, the portable racking actuator anti-torque device 220 is shown depressing the circuit breaker racking screw access window shutter 120 and the drive socket 210 is ready to engage the breaker racking screw window 110.

Referring now to FIG. 4C, the portable racking actuator 200 is pushed toward the circuit breaker racking screw 130 in order to fully engage the drive socket 210 with the circuit breaker racking screw 130 while the anti-torque device 220 engages the sides of the circuit breaker racking screw access window 110.

Figure 5A:
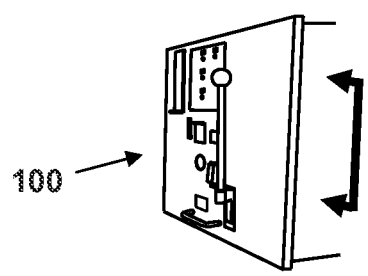
FIG. 5A shows the sectional view of the draw-out circuit breaker that is depicted in FIGS. 5B and 5C.
Figure 5B:
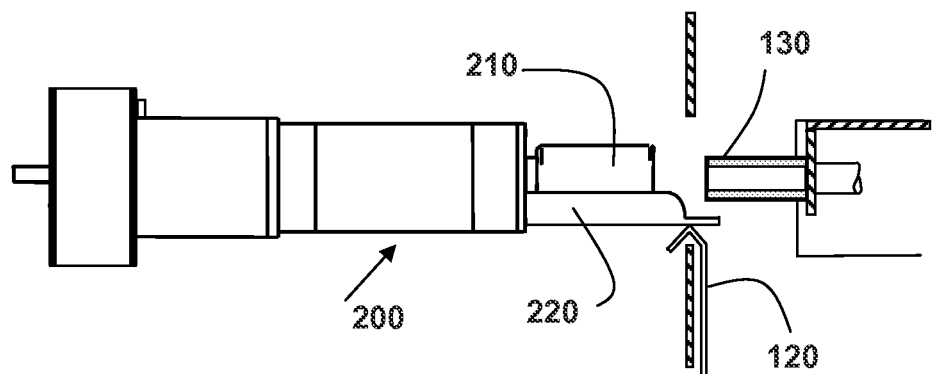
FIG. 5B is a sectional view of the portable racking device depressing the circuit breaker racking screw access window shutter.
Figure 5C:
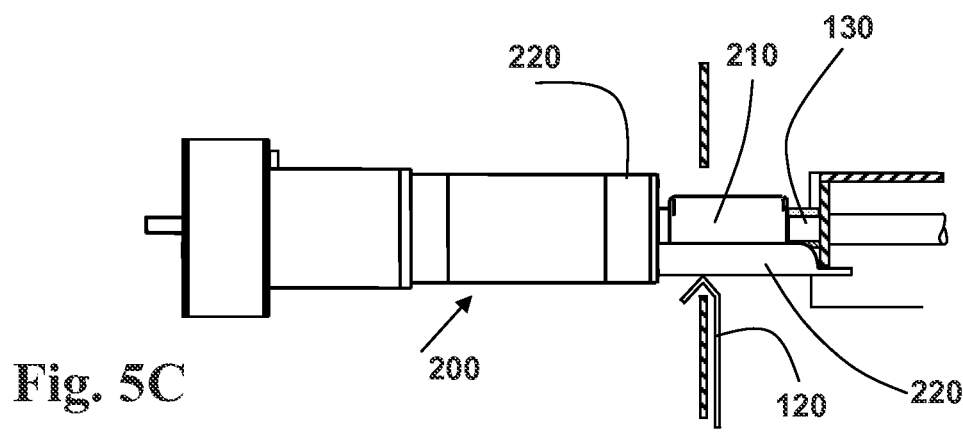
FIG. 5C is a sectional view of the portable racking device fully engaging the circuit breaker racking screw and the anti-torque device is fully engaging the circuit breaker racking screw access window.

Proceeding to FIG. 5A shown is a front plate and control interface for the circuit breaker 100 as a reference for the depictions of the disclosure in FIG. 5B and FIG. 5C. A bar with arrows is drawn across FIG. 5A to indicate the direction of the cross sectional views to be depicted in FIG. 5B and FIG. 5C.

With reference to FIG. 5B, which is a sectional view of the circuit breaker 100 as indicated in FIG. 5A, the portable racking actuator anti-torque device 220 is shown depressing the circuit breaker racking screw access window shutter 120 and the drive socket 210 is beginning to engage the breaker racking screw window 110.

Referring now to FIG. 5C, the portable racking actuator 200 is pushed toward the circuit breaker racking screw 130 in order to fully engage the drive socket 210 with the circuit breaker racking screw 130 while the anti-torque device 220 engages the sides of the circuit breaker racking screw access window 110.

Figure 6:
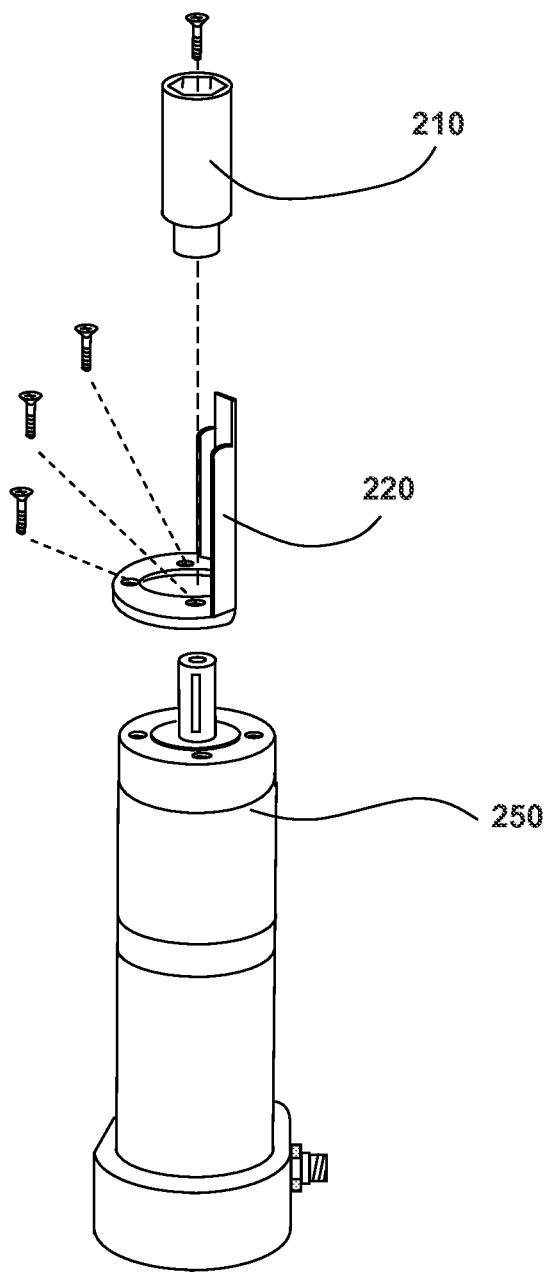
FIG. 6 is an exploded view of the ant-torque device assembly in relation to the gear motor.

Referring next to FIG. 6, a partial exploded view of the portable racking device is shown. The anti-torque device 220 is affixed to the gear motor 250 with a number of fasteners. The drive socket 210 fits on the output shaft of the gear motor 250.

Figure 7:
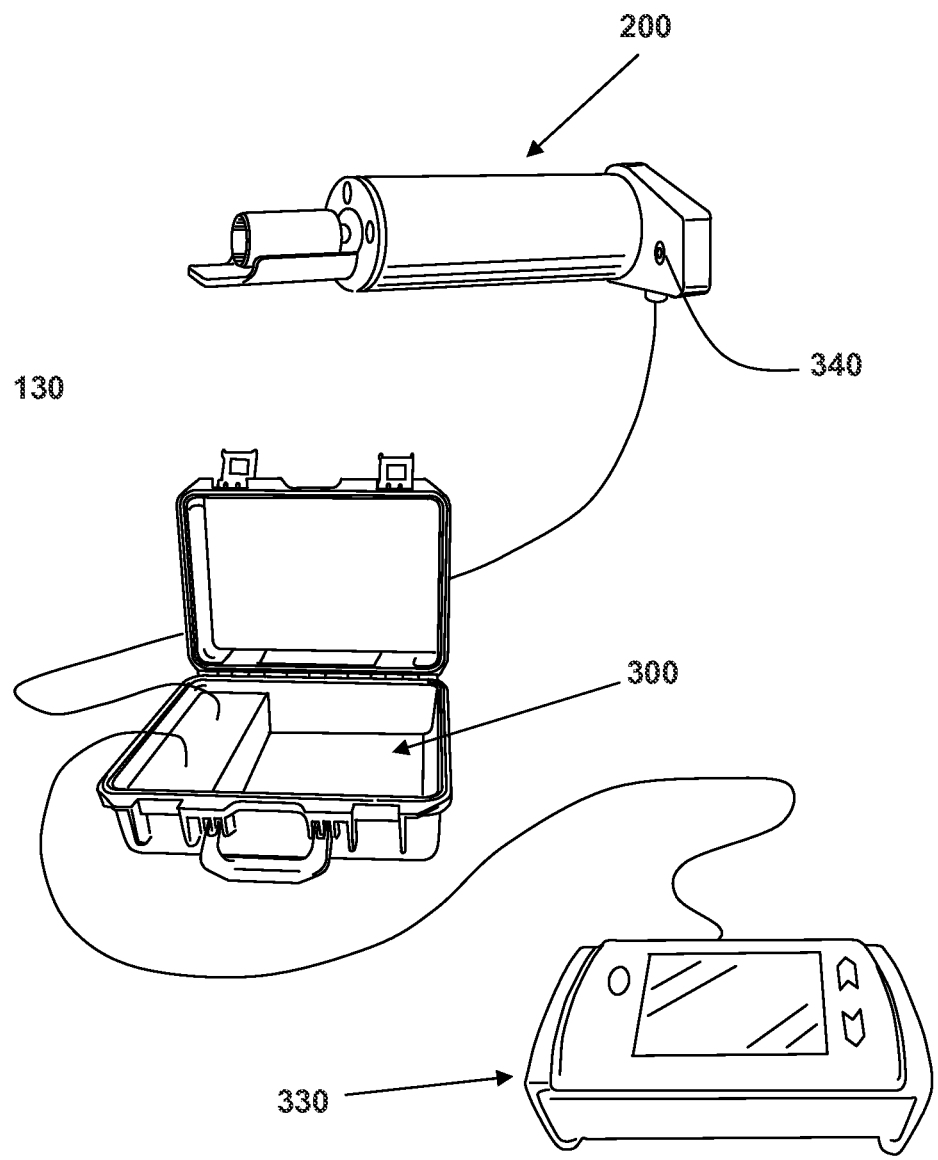
FIG. 7 depicts the portable racking actuator system; actuator, carrying case with power supply, and remote control station.

Moving on to FIG. 7, the major components of the system —the portable racking actuator 200, the carrying case/power supply 300 and the hand-held control station 330 —are depicted in relationship to each other. The closed-circuit video camera 340 is mounted on the portable racking actuator 200 and is aimed to view the breaker position indicator 150, as depicted in FIG. 3B. The image of the breaker position indicator 150 (FIG. 2B) is displayed on the hand-held control station 330. In some instances, the hand-held control station 330 can render on the closed-circuit video camera 340 the distance and the direction that the breaker 100 has moved. The distance and the direction that the breaker 100 has moved can be determined and provided by a shaft encoder configured to determine the distance and the direction that the breaker 100 has moved as a function of a number of revolutions of the breaker racking screw 130.

We claim:

1. A portable, motorized device for remotely racking a drawout circuit breaker, the portable, motorized device comprising:
   a gear motor and a gearbox operatively attached to a drive socket configured to engage a breaker racking screw;
   a fixed-position, anti-torque device affixed to the gear motor, the fixed-position, anti-torque device configured to engage a breaker racking screw support frame;
   a power supply configured to power the gear motor;
   a controller configured to control the gear motor; and
   an operator interface remotely communicatively coupled to the gearbox, wherein the operator interface comprises a video display and the operator interface is configured to control the gear motor.

2. The portable, motorized device of claim 1, wherein the gear motor is an alternating current motor.

3. The portable, motorized device of claim 1, wherein the gear motor is a brushed direct current motor.

4. The portable, motorized device of claim 1, wherein the gear motor is a brushless direct current motor.

5. The portable, motorized device of claim 1, wherein the fixed-position, anti-torque device is oriented substantially parallel to a longitudinal axis of the drive socket.

6. The portable, motorized device of claim 1, wherein the drive socket fits a breaker racking screw comprising a hexagonal shape or a square shape.

7. The portable, motorized device of claim 1, wherein the fixed-position, anti-torque device is rectangularly shaped.

8. The portable, motorized device of claim 1, wherein the fixed-position, anti-torque device is 'L' shaped.

9. The portable, motorized device of claim 1, wherein the fixed-position, anti-torque device is polygonal.

10. The portable, motorized device of claim 1, wherein the fixed-position, anti-torque device comprises a flat tang.

11. The portable, motorized device of claim 1, further comprising a motor current sensor in communication with a motor control circuit, the motor current sensor communicating to the motor control circuit an amount of torque applied to the breaker racking screw.

12. The portable, motorized device of claim 1, further comprising a shaft encoder that is configured to determine a distance and a direction a circuit breaker has moved as a function of a number of revolutions of the breaker racking screw.

13. An apparatus, comprising:
   a gear motor and a gearbox operatively attached to a drive socket configured to a breaker racking screw;
   a fixed-position, anti-torque device affixed to the gear motor and oriented substantially parallel to a longitudinal axis of the drive socket, the fixed-position, anti-torque device configured to engage a breaker racking screw support frame;
   a power supply configured to power the gear motor; and
   a hand-held controller remotely communicatively coupled to the gear motor and configured to control the gear motor, wherein the hand-held controller further comprises a video display.

14. The apparatus of claim 13, further comprising:
   a motor current sensor in communication with the hand-held controller, the motor current sensor communicating to the hand-held controller an amount of torque applied to the breaker racking screw; and wherein the hand-held controller is further configured to render the amount of torque applied to the breaker racking screw on the video display.

15. The apparatus of claim 13, further comprising:

a shaft encoder that is configured to determine a distance and a direction of a circuit breaker that has moved, as a function of a number of revolutions of the breaker racking screw, and report the distance and direction to the hand-held controller; and wherein the hand-held controller is further configured to render the distance and the direction that the circuit breaker has moved on the video display.

16. The apparatus of claim 13, wherein the fixed-position, anti-torque device is oriented substantially parallel to a longitudinal axis of the drive socket.

17. A system, comprising:

a gear motor and a gearbox operatively attached to a drive socket configured to engage a breaker racking screw;

a fixed-position, anti-torque device affixed to the gear motor, the fixed-position, anti-torque device configured to engage a breaker racking screw support frame; and a hand-held remote controller remotely communicatively coupled to the gearbox and configured to control the gear motor, wherein the hand-held remote controller comprises a video display.

18. The system of claim 17, further comprising a motor current sensor in communication with the hand-held remote controller, the motor current sensor communicating to the hand-held remote controller an amount of torque applied to the breaker racking screw; and wherein the hand-held remote controller is further configured to render the amount of torque applied to the breaker racking screw on the video display.

19. The system of claim 17, further comprising:

a shaft encoder that is configured to determine a distance and a direction of a circuit breaker has moved, as a function of a number of revolutions of the breaker racking screw, and report the distance and direction to the hand-held remote controller; and wherein the hand-held remote controller is further configured to render the distance and the direction that the circuit breaker has moved on the video display.

20. The system of claim 17, wherein the fixed-position, anti-torque device is oriented substantially parallel to a longitudinal axis of the drive socket.

* * * * *